United States Patent [19]

Burzynski et al.

[11] Patent Number: 4,539,232
[45] Date of Patent: Sep. 3, 1985

[54] SOLVENTLESS LIQUID ORGANOPOLYSILOXANES

[75] Inventors: Alfred J. Burzynski; Edward J. Stengle, both of Toledo, Ohio

[73] Assignee: Owens-Illinois, Inc., Toledo, Ohio

[21] Appl. No.: 517,498

[22] Filed: Aug. 29, 1983

Related U.S. Application Data

[63] Continuation of Ser. No. 384,465, Jun. 3, 1982, abandoned, which is a continuation-in-part of Ser. No. 306,577, Sep. 29, 1981, abandoned.

[51] Int. Cl.³ .............................................. A23F 2/00
[52] U.S. Cl. ..................................... 427/387; 528/10;
528/12; 556/450; 556/455; 556/457; 556/459;
427/201; 427/203; 427/204; 427/379;
427/407.1; 524/789; 524/847; 524/858;
524/859; 524/495; 524/445; 524/447; 524/442
[58] Field of Search ................... 528/10, 12; 427/201,
427/203, 204, 379, 387, 407.1; 524/789, 847,
858, 859, 495, 445, 447, 442; 556/450, 455, 457,
459

[56] References Cited

U.S. PATENT DOCUMENTS 3,389,114 6/1968 Burzynski et al. ................. 260/32.8
4,271,212 6/1981 Stengle .............................. 427/203

*Primary Examiner*—Melvyn I. Marquis
*Attorney, Agent, or Firm*—John R. Nelson

[57] ABSTRACT

A method for producing solventless liquid organopolysiloxanes is disclosed. The method involves hydrolyzing an organo silicon composition comprising at least one compound having the general formula $$Y_{(4-n)}Si(OR)_n$$

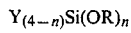

where Y is phenyl or a primary or secondary alkyl group having from one to four carbon atoms, R is an alkyl group having from one to three carbon atoms, and n is an integer from one to four, and wherein the ratio of OR groups to silicon atoms in the composition is from 2.3:1 to 3.1:1. The products of hydrolysis are then heated to cause substantial siloxane formation by condensation and to distill water and alcohol by-products. Heating is continued until the water content of the resulting siloxane composition is less than 1 percent. The purity of the organo silicon composition, the amount of water used for hydrolysis, the amount of acid present during hydrolysis, and the heating of the organopolysiloxane are so controlled that the solventless organopolysiloxane has a viscosity at 25° C. of at least 25 cps. but not greater than 10,000 cps.

9 Claims, 9 Drawing Figures

EQUATION I $$Y_3SiA + H_2O \longrightarrow Y_3SiOH + HA$$

EQUATION II $$Y_2SiA_2 + 2H_2O \longrightarrow Y_2Si(OH)_2 + 2HA$$

EQUATION III $$YSiA_3 + 3H_2O \longrightarrow YSi(OH)_3 + 3HA$$

EQUATION IV $$SiA_4 + 4H_2O \longrightarrow Si(OH)_4 + 4HA$$

EQUATION V $$nY_2Si(OH)_2 \longrightarrow \left[\begin{array}{c} Y \\ Si-O- \\ Y \end{array}\right]_n + nH_2O$$

EQUATION VI $$Y_2Si(OH)_2 + 2YSi(OH)_3 \longrightarrow \begin{array}{ccc} Y & Y & Y \\ -Si-O-Si-O-Si-O- \\ O & Y & | \end{array} + 4H_2O$$

EQUATION VII $$Y_2Si(OH)_2 + 2Y_3SiOH \longrightarrow \begin{array}{ccc} Y & Y & Y \\ Y\,Si-O-Si-O-Si\,Y \\ Y & Y & Y \end{array} + 2H_2O$$

EQUATION VIII
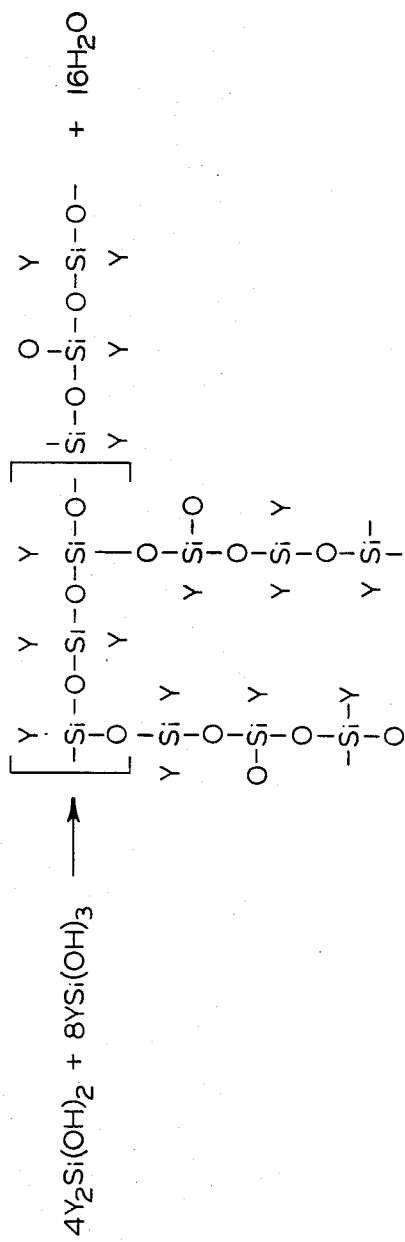

EQUATION IX
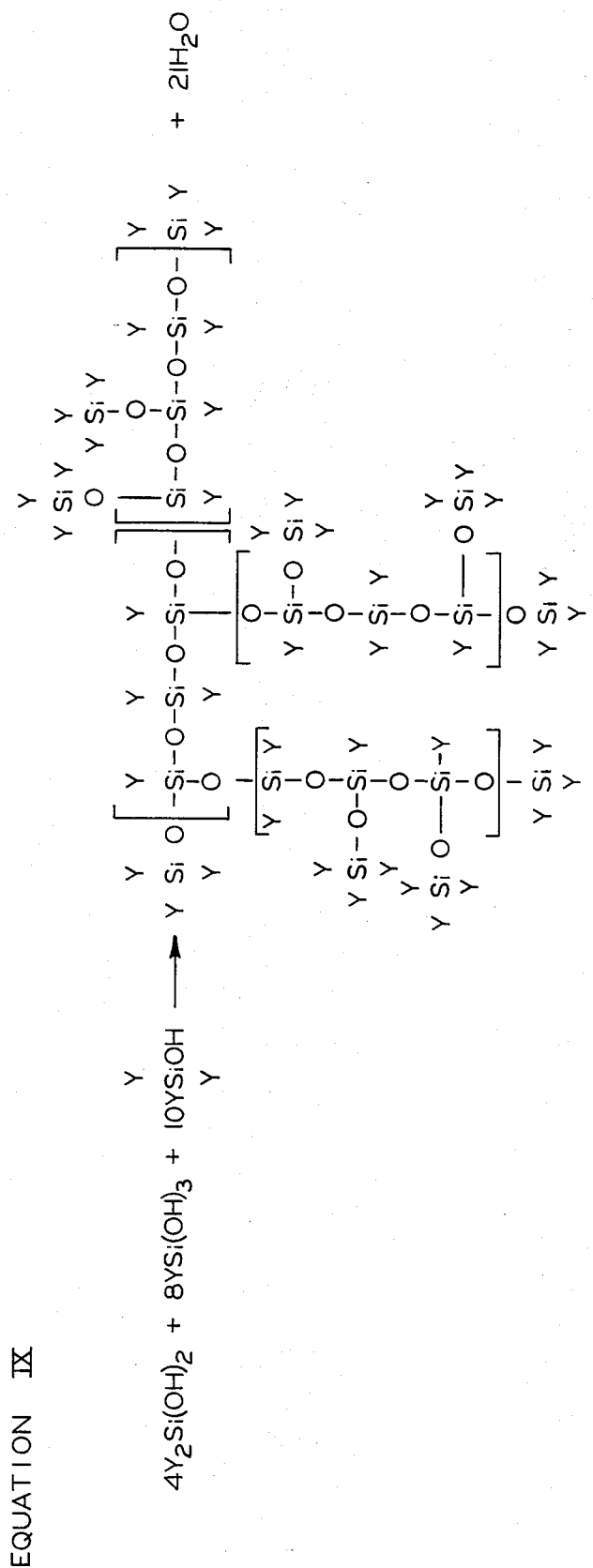

SOLVENTLESS LIQUID ORGANOPOLYSILOXANES

REFERENCE TO RELATED APPLICATION

This is a continuation of application Ser. No. 384,465 filed June 3, 1982, now abandoned, which application is a continuation in part of application Ser. No. 306,577 filed Sep. 29, 1981, for "Solventless Resin", now abandoned.

BACKGROUND OF THE INVENTION

The present invention relates to a process for production of a solventless silicone resin, and more specifically, this invention relates to a process for producing a solventless organopolysiloxane resin which exhibits excellent viscosity values at ambient temperatures, and to the resin per se. Organopolysiloxane resins are well known in the art and typically comprise a resin composed of trifunctional and difunctional siloxy units with a silanol content varying from 0.1 to 8.0 percent by weight and optionally, when produced from alkoxysilanes, an alkoxy content varying from 0 to 4 percent by weight. Such silicone resins as set forth above, which are composed of trifunctional and difunctional siloxy units, when dissolved in suitable solvents, have been found useful for forming varnishes and silicone based paints, as well as for resins adapted for molding and encapsulating purposes. The silicone resins are highly desirable for industrial applications since they have better high temperature stability properties when compared to ordinary paints and potting compounds.

Accordingly, a highly successful silicone coating composition typically comprises a suitable solvent or solvent system and, dissolved therein, difunctional and trifunctional siloxy units since the combination of such units imparts to the resin, when cured, desired flexibility as well as the ability to withstand extreme high temperatures and cyclic variations thereof.

The hydrolysis-condensation products of silanes such as methyltrialkoxysilanes, dimethyldialkoxysilanes diphenyldialkoxysilanes, methylphenyldialkoxysilanes and phenyltrialkoxysilanes are of commercial interest because such products possess unique properties among silicone resins. Usually the alkoxy groups in such silanes are methoxy, ethoxy, or occasionally, propoxy, including isopropoxy.

In some instances, it can be difficult to control the hydrolysis and condensation rates of organotrialkoxysilanes. Some of the silanol molecules (formed by hydrolysis of the silanes) which have one or more hydroxyl groups bonded directly to a silicon atom, have the tendency to form the corresponding ether analogs (siloxanes) by an equilibrium reaction that may be regarded as the loss of one molecule of water per two such hydroxyl groups. The chemical reactivity of silanols, especially silanetriols, to form siloxanes is so great that selectivity in product formation is seldom possible and complexity of the reaction mixture often prevents a positive identification of specific products.

The high activity of most silanols makes it desirable to form them in situ. This is usually accomplished by hydrolysis of precursors which contain silicon atoms attached to substituents convertible to hydroxyl groups.

The typical hydrolysis reactions of silanes and the like to silanols may be characterized by Equations I through IV of the attached drawing, in which Y represents, for example, an organic group such as a hydrocarbon radical and A represents a hydrolyzable group such as alkoxy. There are other known hydrolyzable groups, e.g., acyloxy, halogen, etc. Exemplary ones of the condensation reactions of silanols are illustrated in Equations V through IX of the attached drawings, where n indicates a given number of molecules. The condensation reactions all involve the formation of water and of Si—O—Si linkages. A silanediol is difunctional and, as shown in Equation V, is capable of forming a repeating unit which can be a straight chain or can be cyclic in nature.

A silanetriol is trifunctional, capable both of forming a repeating unit and of forming a branched structure which can include cross-links between different straight chain or cyclic molecules. One of the possible reactions of two molecules of a silanetriol with one molecule of a silanediol is shown in Equation VI; this reaction produces a siloxane chain of the silicon atoms connected to one another by Si—O—Si linkages, and capable both of an increase in chain length and of branching because of the bifunctionality of the 1- and 3-silicon atoms. A reaction involving eight molecules of a silanetriol and four molecules of a silanediol is shown in Equation VIII. The reaction shown produces the three silicon atom siloxane chain of Equation VI (enclosed within brackets) and three other such chains condensed therewith to effect both an increase in chain length and branching.

The triorganic silanol (having only one OH group and three organo groups) is monofunctional relative to hydrolysis and condensation and, as a consequence, can serve as a "chain stopper", as shown in Equation IX. Equation IX is similar to Equation VIII in that it shows the reaction of eight molecules of a silanetriol and four molecules of a silanediol to produce the same structure (each of the three silicon atom siloxane chains of which is enclosed within brackets in Equation IX), but is different in also showing each of the reactive sites as "end stopped" as a consequence of the reaction of ten molecules of a triorganosilanol. Equation VII shows the reaction of one molecule of a silanediol with two molecules of a triorganosilanol.

The properties of an organopolysiloxane depend mainly upon the identity of the organo group or groups therein, the identity and number of hydrolyzable groups remaining therein, and molecular weight and structure. A silane having two organo groups and two hydrolysable groups is theoretically capable of hydrolysis to a silanediol which is theoretically capable of the condensation reaction shown in Equation V. However, depending on such factors as the specific identity of the silane and the conditions used for hydrolysis and condensation, both reactions can be expected to be incomplete to a greater or lesser extent. For example, nearly complete hydrolysis can be expected if a chlorosilane is hydrolyzed in an excess of water while many unhydrolyzed groups can be expected if an alkoxysilane is hydrolyzed in a neutral system.

The prior art relating to the hydrolysis-condensation of alkoxysilanes to organopolysiloxanes has concentrated on control of an acid pH. To avoid premature gelation and to effect hydrolysis and polysiloxane formation at a conveniently rapid and controllable rate, it was regarded as essential to maintain the acidity of the hydrolysis-condensation reaction within certain limits. The amount of acid catalyst, such as hydrochloric acid, used was fairly carefully regulated. A slight deviation from a prescribed amount, such as from inadvertent mistake, could cause large variations in the polymer produced as an end product. The reactions of hydrolysis and condensation are normally quite rapid and, as a consequence, sensitive to control.

U.S. Pat. No. 3,389,114 to Burzynski and Martin discloses hydrolyzing a reaction mixture of a methyltrialkoxysilane, up to 5 mole percent of certain other alkoxy silanes, and water, in the presence of from 0 to about 700 parts of acid, expressed as HCl, per million parts of total silane reactant material. The Examples of this patent describe the hydrolysis of a methyltrialkoxysilane and mixtures therewith of up to 5 mole percent of phenyltriethoxysilane and of trimethylethoxysilane. It has now been found that some of the procedures of the Examples of this patent, if carried out using high purity silanes which are presently available, can be modified to produce a solventless organopolysiloxane resin; specifically, if the procedure of Example 1 (A) is carried out using a high purity methyltriethoxysilane starting material, the methylsiloxane partial condensation product which results, after having been heated until the water content is less than 1 percent, is a solventless resin according to the instant invention which, for example, can be cooled to ambient temperature, brushed onto a substrate as a coating, and cured by heating to about 375° C. for one hour.

U.S. Pat. No. 4,239,877 to Roedel discloses a process for producing a solventless silicone resin having a viscosity at 100 percent solids varying from 200 to 5000 cps. at 25° C. Water and alcohol are added to organochlorosilanes to produce a silicone alkoxylate which, after refluxing, is washed repeatedly with alcohol until its acid content is below 1000 parts per million. An alkali metal hydroxide is then added to reduce the acidity of the silicone alkoxylate to 100 parts per million or less. Next, water is added in the proportion of 0.2 to 0.8 molecule per alkoxy group and the composition is heated to complete hydrolysis with the added water. A solventless silicone resin is then produced by stripping of excess water and alcohol. The resin can be cured in the presence of such a metal salt as zinc octoate, preferably in combination with gamma-aminopropyltriethoxysilane, or the like.

U.S. Pat. No. 4,239,867 to Legrow describes a solventless organopolysiloxane composition comprising (a) an organopolysiloxane containing 67 to 85 mole percent $C_6H_5SiO_{3/2}$ and 33 to 15 mole percent $H_2C=CH(CH_3)_2SiO_{\frac{1}{2}}$ units, (b) a silicon hydride crosslinker for (a), (c) a platinum catalyst, (d) a catalyst inhibitor, and (e) a reactive diluent of the formula $[CH_2=CH(CH_3)_2SiO]_2Si[C_6H_5]_2$. Resins produced by curing the solventless organopolysiloxane composition are useful for encapsulating electronic equipment such as transformers and the like.

Methoxy-containing silicone resin intermediates are offered commercially, for example under the trade designations SR191, SR193 and 3037, for reaction with saturated polyester and oil-free alkyds to produce vehicles for high performance finishes and the like. These intermediates are believed to be produced by a method similar to that disclosed in Roedel U.S. Pat. No. 4,239,877, and described above, from organosilane compositions having about 2.1:1 hydrolyzable groups per silicon atom. The intermediates do not cure to a thermoset condition, even after prolonged heating, for example 24 hours at 90° C. followed by 2 hours at 150° C.

SUMMARY OF THE INVENTION

A principal object of the present invention is to provide a process for preparing a solventless organopolysiloxane.

A related object of this invention is to provide a solventless organopolysiloxane resin that can be manufactured with a minimum of steps.

Another object of the invention is to provide a solventless organopolysiloxane resin that can be "B" staged without detrimental gelling.

An additional object of this invention is to provide an organopolysiloxane resin that can be readily used in a solvent-free condition and which can be cured without the use of catalysts.

In accordance with the invention, the solventless liquid organopolysiloxanes are made by a method which comprises a minimum number of steps. The resulting solventless resin can be cured without the aid of a catalyst and is quite stable at elevated temperatures.

DESCRIPTION OF THE PREFERRED EMBODIMENTS

In general, the present organopolysiloxanes are prepared by controlled hydrolysis of a hydrolyzable silane composition in an aqueous system in which hydrolysis of the silane composition does not proceed to completion. Following hydrolysis, the hydrolyzed silane is condensed to form a resin which can be "B" staged and subsequently used without the necessity of adding a solvent to the resin. The "B" staged resin may be coated on a fibrous or other substrate, cast or molded and cured by heat. It is viscous yet is not gelled, and has a long shelf life before gelling occurs.

The first step in producing an organopolysiloxane resin that remains stable at ambient temperatures and can be used in a variety of applications without the addition of solvents, involves the incomplete hydrolysis, in an aqueous system, of a hydrolyzable organo silicon composition. The composition is one comprising at least one compound having the general formula

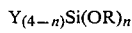
$$Y_{(4-n)}Si(OR)_n$$

Where Y is phenyl or a primary or secondary alkyl group having from one to four carbon atoms, R is an alkyl group having from one to three carbon atoms, and n is an integer from one to four. The ratio of OR groups to silicon atoms in the composition is from 2.3:1 to 3.1:1. The products of hydrolysis are then heated to cause substantial siloxane formation by condensation and to distill water and alcohol by-products. Heating is continued until the water content of the siloxane composition is less than 1 percent, at which point the composition is a solventless organopolysiloxane. A coating of the solventless organopolysiloxane can be applied to a substrate, and cured, usually by heating to a temperature from about 260° C. to about 290° C., or the solventless organopolysiloxane can be cast or molded to a desired shape and then cured. In producing the solventless organopolysiloxane the purity of the hydrolyzable organo silicon composition, the amount of water used for hydrolysis, the amount of acid present during hydrolysis, and the heating of the organopolysiloxane are so controlled that the solventless organopolysiloxane has a viscosity at 25° C. of at least 25 cps. but not greater than 10,000 cps. Preferably, this organopolysiloxane resin has a viscosity of at least 100 cps., most desireably at least 1000 cps., but not greater than 9000 cps., most desireably not greater than 7500 cps.

As has been indicated above, the first step in producing an organopolysiloxane resin according to the present invention involves the hydrolysis of a hydrolyzable organo silicon composition comprising at least one compound having the general formula $Y_{(4-n)}Si(OR)_n$ where Y, R and n have the meanings indicated above. These compounds are phenyl and alkyl alkoxy silanes and alkyl orthosilicates. Excellent results have been achieved where the hydrolyzable organo silicon composition has been composed of a mixture of methyltriethoxysilane, dimethyldiethoxysilane and phenyltriethoxysilane, but other silanes represented by the foregoing formula can also be used, either in addition to or in place of those specifically named and, if desired, alkyl orthosilicates can also be employed The only limitations, apart from those dictated by the need for specific properties in the cured material or by the desire to use particular conditions for hydrolysis and the like, are those previously stated that the ratio of OR groups to silicon atoms in the composition must be from 2.3:1 to 3.1:1 and that the purity of the hydrolyzable organo silicon composition, the amount of water used for hydrolysis, the amount of acid present during hydrolysis, and the heating of the organopolysiloxane must be so controlled that the solventless organopolysiloxane has a viscosity of 25° C. of at least 25 cps. but not greater than 10,000 cps. In general, if other factors remain equal, increasing the ratio of OR groups to silicon atoms in the hydrolyzable organo silicon composition causes an increase in the viscosity of the solventless organopolysiloxane product because of the consequent increase in cross-linking (compare Equations V and VIII) and in average molecular weight. Similarly, increasing the amount of acid present during hydrolysis, the amount of water available for hydrolysis and the severity of the heating step employed to reduce the water content of the siloxane composition will all tend to increase the molecular weight of the solventless organopolysiloxane and, as a consequence, its viscosity. Conversely, other factors being equal, reducing the ratio of OR groups to silicon atoms, the amount of acid present during hydrolysis, the amount of water available for hydrolysis or the severity of the final heating step to remove water and produce the solventless organopolysiloxane will tend to reduce both molecular weight and viscosity. As a consequence, considerable latitude is available with respect to any given factor influencing molecular weight and viscosity, provided that compensating changes are made, as required, to maintain viscosity within the indicated limits. Alkoxysilanes are usually produced from halosilanes, most often from chlorosilanes, and, as a consequence, are commonly contaminated with halosilane impurities. Many such impurities are acidic, or form acids by reaction with water; such impurities influence the molecular weight of a solventless organopolysiloxane resin according to the invention and, as a consequence, its viscosity, in the same manner as does the acid used for hydrolysis.

The following Examples in which, as elsewhere herein, all percentages and parts are by weight, unless otherwise indicated, and all temperatures are in degrees C., are presented solely for the purpose of further illustrating and disclosing the invention, are not to be construed as limitations thereon. Examples 1, 2 and 3 constitute the best modes presently contemplated by the inventors, which one is optimum depending upon what result is desired.

EXAMPLE 1

A solventless organopolysiloxane resin was produced from 1150.8 g. methyltriethoxysilane (MTS), 1234.8 g. dimethyldiethoxysilane (DMDES), 1526 g. phenyltriethoxysilane (PTS), 712 g. distilled water and 22.4 ml. 0.1N HCl. The reaction was conducted in a 5 liter, 3-neck flask equipped with a stir plate, a magnetic stir bar, a heating mantle controlled by a rheostat, and two reflux condensers, one of which was fitted with an initially closed Garman take-off. The silanes were charged to the flask, followed by the water and the acid, and heating and stirring were commenced. The reaction mixture reached a temperature of 45° after 10 minutes, 70° after 15 minutes, and 80° after 18 minutes; refluxing commenced after 25 minutes. Thereafter, the rheostat was adjusted, as required, to maintain the reaction mixture under gentle reflux for a period of four hours. After four hours of refluxing, the Garman take-off was opened to begin removal of distillate; heating was continued to cause distillation of volatiles from the reaction mixture. The distillate removed through the Garman take-off was collected, amounting to 1500 ml. after 1½ hours of distillation, 2500 ml. after 2 hours of distillation. Heating and stirring were then discontinued, and the hot hydrolysis-condensation reaction products were filtered through glass wool into a clean, 3-liter flask equipped with a stir bar, a stir plate, a reflux condenser fitted with a Garman take-off and a heating mantle served by a rheostat. Heating was continued for approximately two additional hours until the pot temperature reached 155°; additional distillate collected during this time amounted to 450 ml. The distillation was then stopped and vacuum was applied to the flask, absolute pressure about 200 mm. Hg, for about 30 minutes, during which time the pot temperature dropped from 120° to 85°. The resin was found, after cooling for 16 hours, to be clear, to amount to 1975 g., to have an average molecular weight of 2300, and to have a viscosity of 2000 cps., measured at 25° using a Brookfield LVT viscometer equipped with a No. 3 spindle, 30 rpm.

EXAMPLE 2

A solventless organopolysiloxane according to the invention was produced generally by the procedure described in Example 1, above, from 103 g. MTS, 110 g. DMDES, 545 g. PTS, 121 g. distilled water and two drops (approximately 0.1 ml.) 1N hydrochloric acid; the maximum pot temperature reached during the final distillation, hereinafter called the "Precure Temperature", was 160°. The procedure produced 440 g. solventless resin and 520 ml. distillate. The solventless resin had a viscosity, measured at 25° using a Brookfield viscometer equipped with a No. 3 spindle rotated at thirty revolutions per minute, of 3480 cps., and an average molecular weight of 890. By analysis, it was determined that the solventless polysiloxane had an ETOH content (the sum of free ethanol and ethoxyl groups) of 13 percent, an $H_2O$ content (the sum of water and silanol OH groups) of 2.9 percent, an ethanol content of 4.1 percent and a water content by liquid chomatography less than 1 percent; by difference, the ethoxyl content (13 minus 4.1) was 8.9 percent.

EXAMPLE 3

A solventless organopolysiloxane resin according to the invention was produced generally by the procedure described in Example 1, above, from 411 g. MTS, 110 g. DMDES, 136 g. PTS, 122 g. distilled water and one drop (approximately 0.05 ml.) 1N hydrochloric acid. The Precure Temperature was 140° C.; the resin yield was 320 g.; the total distillate collected during production of the resin amounted to 570 ml. The resin was found to have a viscosity, measured at 25° with a Brookfield viscometer equipped with a No. 3 spindle driven at 30 revolutions per minute, of 3920 cps. and a molecular weight of 2230. The resin was found, by analysis, to have a water content by liquid chromatography less than 1 percent, an ETOH content (the sum of free, ethanol and ethoxyl groups) of 12 percent an ethanol content of 2.7 percent, and an $H_2O$ content, (the sum of free water and silanol OH groups) of 3.0 percent and an ethoxyl content, by difference (12 minus 2.7), of 9.3 percent.

EXAMPLE 4

A solventless organopolysiloxane according to the invention was produced generally by the procedure described in Example 1, above, from 102.8 g. MTS, 441 g. DMDES, 136.3 g. PTS, 139.2 g. distilled water and two drops (approximately 0.1 ml.) 1N hydrochloric acid; the Precure Temperature was 140°. The procedure produced 336.7 g. solventless resin and 580 ml. distillate. The solventless resin had a viscosity, measured at 25° using a Brookfield viscometer equipped with a No. 3 spindle rotated at thirty revolutions per minute, of 30 cps., and an average molecular weight of 920. By analysis, it was determined that the solventless polysiloxane had a ETOH content (the sum of free ethanol and ethoxy groups) of 7.9 percent, an $H_2O$ content (the sum of water and silanol OH groups) of 3.0 percent, an ethanol content of 2.8 percent; by difference, the ethoxyl content (7.9 minus 2.8) was 5.1 percent. No free water was detected by liquid chromotography.

EXAMPLES 5 THROUGH 10

In order to demonstrate the relationship between the amount of water used and the properties of an organopolysiloxane resin produced according to the instant invention, other factors being kept constant, several such resins were produced from a charge made up of 113 g. MTS, 121.3 g. DMDES, 150 g. PTS, an amount of distilled water ranging from 55.8 g. to 102.4 g. and two drops (approximately 0.1 ml.) 1N hydrochloric acid. In all cases, the precure temperature was 150°. Table I, below, gives the amount of water used in each instance and the following properties of the resins which were produced: Brookfield viscosity, measured at 25°, 60 rpm., using a No. 3 spindle, unless otherwise indicated; the average molecular weight; the water content by liquid chromatography; the ETOH content (the sum of free ethanol and ethoxyl groups); $H_2O$ content (the sum of water and of silanol OH groups); the ethanol content; the ethoxyl content (ETOH content minus ethanol content); and the silanol OH content (percent $H_2O$ plus silanol OH groups minus percent $H_2O$ by liquid chromatography.

TABLE I

| EXAMPLE | 5 | 6 | 7 | 8 | 9 | 10 |
|---|---|---|---|---|---|---|
| Distilled water g. | 55.8 g. | 65.2 g. | 74.5 g. | 84.0 g. | 93.6 g. | 102.4 |
| Viscosity (cps.) | 160 | 450 | 560 | 1900 | 4300 | 9600 |
| Average Molecular Weight | 1418 | 1850 | 2251 | 2406 | 3715 | 6441 |
| Water content, Percent, by liquid chromatography | <0.2 | <0.2 | <1 | <1 | <1 | <1 |
| ETOH content | 6.12 | 4.96 | 6.38 | 4.43 | 3.25 | 3.12 |
| $H_2O$ content, Percent | 1.3 | 2.2 | 3.8 | 4.0 | 5.4 | 4.6 |
| Percent Ethanol | 2.33 | 1.88 | 2.76 | 2.42 | 1.63 | 1.23 |
| Ethoxy Content, Percent | 3.79 | 3.08 | 3.62 | 2.01 | 1.62 | 1.89 |
| Silanol OH content, Percent | 0.8 | 2.0 | 2.8 | 3.0 | 4.4 | 3.6 |

For purposes of comparison, but not in accordance with the instant invention, the procedure of Examples 5 through 10, above, was repeated except that the amount of distilled water used was 111.8 g. The Brookfield viscosity at 25°, using a No. 4 spindle at 12 rpm., was found to be 39800 cps. It was not found to be possible to obtain a satisfactory sample from which the molecular weight of the resin could be determined. The water content by liquid chomotography was found to be less than 1 percent, the ETOH content 1.74 percent, $H_2O$ content 4.8 percent, the ethanol content 0.68 percent, the ethoxyl content 1.06 percent and the silanol OH content 3.8 percent.

EXAMPLE 11

A solventless organopolysiloxane resin according to the invention was produced generally by the procedure described in Example 1, above, from 356 g. MTS, 54 g. distilled water and five drops (approximately ¼ ml.) 1N hydrochloric acid; the Precure Temperature was 150°. The procedure produced 170 g. solventless resin and 300 ml. distillate. The solventless resin had a viscosity, measured at 25° using a Brookfield viscometer equipped with a No. 3 spindle rotated at sixty revolutions per minute, of 260 cps., and an average molecular weight of 14,000. By analysis, it was determined that the solventless polysiloxane resin had an ETOH content of 23 percent, an $H_2O$ content of 0.5, and an ethanol content of 6.6 percent; by difference, the ethoxyl content was 16.4 percent. No water was detected by liquid chromatography.

It will be appreciated, from a careful study of the foregoing Examples and of the data presented therein, that the percent of the stoichiometric amount of water that can be used in producing a solventless organopolysiloxane resin according to the invention varies as an inverse function of the number of hydrolyzable groups per silicon atom in the initial hydrolyzable organo silicon composition used to produce the resin. For instance, Example 11 involved the hydrolysis of 2 moles of MTS with 3 moles of distilled water, mole ratio of water to silane 1.5:1. Since MTS is trifunctional relative to hydrolysis (see Equation III), an amount of water which would give a mole ratio of 3:1 relative to the silane would be the stoichiometric amount for hydrolysis. Accordingly, the procedure of Example 11 used 50 percent of the water stoichiometrically required for hydrolysis. In Examples 5 through 10, on the other hand, a silane composition composed of of 0.63 mole of MTS, 0.82 mole of DMDES and 0.63 mole of PTS was hydrolyzed and condensed with water in such proportions that the mole ratio of water to silane was 1.5:1, 1.75:1, 2.0:1, 2.25:1, 2.5:1 and 2.75:1, respectively. Since MTS and PTS are trifunctional silanes and DMDES is difunctional, a mole ratio of water to silane of 2.61:1 would be stoichiometric for hydrolysis. Accordingly, the amounts of water used in the procedures of Examples 5 through 10 range from 57.2 percent to 104.8 percent of the stoichiometric water for hydrolysis.

EXAMPLES 12 AND 13

In order to demonstrate the relationship between the amount of acid used and the properties of an organopolysiloxane resin produced according to the instant invention, other factors being kept constant, several such resins were produced from a charge made up of 169.5 g. MTS, 225 g. PTS, 181.5 g. DMDES, 83.7 g. $H_2O$ and an amount of 1N hydrochloric acid varying from about 10.8 ml. to about 83.1 ml. In all cases the precure temperature was 150°. Table II, below, gives the amount of hydrochloric acid used in each instance and the following properties of the resins which were produced: Brookfield viscosity, measured at 25°, 60 rpm., using a No. 3 spindle; the average molecular weight; the water content by liquid chromotography; the ETOH content (the sum of free ethanol and ethoxyl groups); $H_2O$ content (the sum of water and of silanol OH groups); the ethanol content; the ethoxyl content (ETOH content minus ethanol content); and the silanol OH content (percent $H_2O$ plus silanol OH groups minus percent $H_2O$ by liquid chromatography).

TABLE II

| EXAMPLE | 12 | 13 | | |
|---|---|---|---|---|
| Ml. 1N hydrochloric acid | 10.8 | 21.7 | 43.4 | 83.1 |
| Viscosity (cps.) | 2160 | 6500 | 43,000 | 79,500 |
| Average Molecular Weight | 8140 | 30,763 | * | N.D.** |
| Water content, Percent, by liquid chromatography | 0.1 | 0.1 | 0.1 | N.D. |
| ETOH content, Percent | 3.6 | 3.4 | 1.2 | N.D. |
| $H_2O$ content, Percent | 2.4 | 1.3 | 0.9 | N.D. |
| Percent Ethanol | 3.6 | 3.4 | 1.2 | N.D. |
| Ethoxyl content, Percent | 4.7 | 0.7 | 0.4 | N.D. |
| Silanol OH content, Percent | 2.3 | 1.2 | 0.5 | N.D. |

*Sample gelled
**Not determined; the viscosity was too high.

When a silane composition is hydrolyzed and condensed, reactions of the type illustrated in the equations of the attached drawings occur, undoubtedly forming many different specific condensates in any given case. Accordingly, the properties of a particular condensate are averages of the properties of the numerous different condensates present. The present invention is based upon the discovery that the hydrolysis and condensation of certain silane compositions can be conducted in such a way that the product of the hydrolysis and condensation reactions is a solventless organopolysiloxane resin. The production of several such solventless organopolysiloxane resins is described in the foregoing Examples, while the cure thereof to a solid, thermoset condition is subsequently described herein. The procedures described in the foregoing Examples can be used to produce solventless organopolysiloxane resins according to the invention from the various compositions disclosed. Such solventless organopolysiloxane resins can also be produced from other silanes and from other silane compositions using either the procedure of one of the foregoing Examples or a straightforward modification thereof. If it is desired to produce a solventless organopolysiloxane resin according to the invention from a silane or silane composition other than one of those specifically disclosed in one of the foregoing Examples, the silane or silane composition can merely be hydrolyzed, and condensed by one of the procedures described above, or by a modification thereof. The Precure Temperature should be high enough that the water content of the resin is less than 1 percent; a simple viscosity check then will indicate whether or not the desired resin was produced. If the viscosity at 25° is greater than 10000 cps. or less than 25 cps., or higher or lower than desired, even if within the indicated range, the hydrolysis-condensation procedure can be readily and suitably revised, as necessary, on the bais of the following guidelines. In general, other factors being equal:

(1) the viscosity of the resin varies as a direct function of the amount of water used for hydrolysis and condensation;
(2) the viscosity of the resin varies as a direct function of the ratio of hydrolyzable groups to silicon atoms;
(3) the viscosity of the resin varies as a direct function of the Precure Temperature;
(4) the viscosity of the resin varies as a direct function of the amount of acid present during hydrolysis and condensation; and
(5) the viscosity of the resin varies as a direct function of the ease of hydrolysis of the alkoxy groups in the silane or silane composition.

In general, the ease of hydrolysis of a silane or silane composition varies as an inverse function of the bulkiness of the organo substituent or substituents and as an inverse function of the bulkiness of the alkoxy group or groups.

The following examples illustrate the cure of a solventless organopolysiloxane resin according to the instant invention.

EXAMPLE 14

A coating composition was produced from 77 parts of a silicone resin produced as described in Example 1 and 23 parts of graphite. The graphite used is an electric furnace, synthetic material which is available from Union Carbide Chemical Company as a finely-divided particulate material under the grade designation "No. 38". A binder was produced by blending the graphite thoroughly with the silicone resin. The binder was then applied to a previously cleaned and primed metal chute of gob feeding apparatus. The chute had been cleaned by heating at about 370°, grit blasting and rinsing with 1,1,1-trichloroethane and had then been primed with a reactive monomeric/polymeric silicone resin which is commercially available under the designation AP-132 from Lord Chemical Company. After the primer had air dried, a coating of the binder described above was brushed onto the chute and a layer approximately one inch thick of a granular top material was dusted onto the uncured binder. Approximately thirty minutes after the top material had been dusted onto the uncured binder, the chute was inverted to enable excess top material to fall therefrom by gravity; the chute was then heated to about 230° for one hour to cure the binder coating. A second coating of the same binder was then applied to the chute and a layer approximately one inch thick of the granular top material was dusted onto the uncured binder. Approximately thirty minutes after the top material had been dusted onto the uncured binder the chute was inverted to enable excess top material to fall therefrom by gravity; the chute was then heated to about 230° for one hour to cure the second binder coating. A third coating of the same binder was then brushed onto the chute, and was cured by heating the chute and the third binder coating to about 230° for one hour.

The granular top material used as described in the preceding paragraph was a blend of 60 parts of No. 155 carbon, 15 parts of grade 4056 graphite, 15 parts of grade 4058 graphite and 10 parts of grade 4015 graphite. The grade 155 carbon is commercially available under the indicated designation from Barnebey-Cheney, Columbus, Ohio. The three grades of graphite identified in this paragraph are commercially available under the indicated designations from Asbury Graphite Mills, Inc., Asbury, N.J.

It is believed that the coated chute produced as described above had a significantly improved service life by comparison with a coated chute produced as described in Stengle U.S. Pat. No. 4,271,212, commencing in column 2, line 25, although no direct comparison has been made; the binder of Example 1 was found by thermogravimetric analysis to have a higher thermal stability than the binder disclosed in said Stengle patent.

EXAMPLE 15

A solventless silicone resin produced as described in Example 1, a glass fabric/aluminum foil laminate, and granular roofing stone were used to produce a roofing material similar to conventional shingles. The laminate, which is commercially available from Duracote Corp., Ravenna, Ohio, was coated with a layer of the silicone resin. Conventionally sized granular roofing stone was then sprinkled onto the silicone resin. After about thirty minutes, the coated surface was inverted to enable excess granular stone to separate therefrom by gravity. A thin coating of the silicone resin was then sprayed over the granular stone of the composite structure and the entire assembly was heated to about 230° for approximately one hour to cure the silicone resin. The result was a composite sheet resembling a conventional shingle, but of dramatically increased resistance to weathering and to separation of granular stone therefrom. The glass fabric/aluminum foil laminate constituted about 26 to 30 percent of the composite, the resin about 23 to 24 percent and the granular stone about 46 to 51 percent.

Examples 14 and 15, above, illustrate mixtures of carbon, graphite and roofing stone with solventless organopolysiloxane resins according to the invention. Such mixtures, and other mixtures of particulate fillers with solventless organopolysiloxane resins according to the invention are expecially advantageous for the production of various high performance coatings. It is usually preferred that such mixtures contain from 2 percent to 25 percent of one of the previously identified or of another particulate filler. Other useful particulate fillers include carbon black, bentonite, clays, fused silica, metal oxide pigments and phosphatized carbon.

The application of a coating of a solventless organopolysiloxane resin according to the invention to a substrate, and cure of the resin coating on the substrate is also advantageous for the production of high performance coatings. The resin itself can be applied to the substrate and cured, either alone or after the addition of a particulate filler, e.g., roofing stone, thereto, or the resin can first be mixed with a particulate filler, and the resulting mixture can be applied to the substrate. The application of a coating of a resin according to the instant invention to a fabric made of glass or other high temperature fibers produces, after cure of the resin, a combined siloxane/fabric material which combines the outstanding high temperature properties of the cured resin and the high temperature properties of the fabric. Such composites can be gloves, protective coatings for tongs, or the like, useful for handling glass at an elevated temperature, for example, before it has been cooled after its initial forming. It is sometimes advantageous to mix betonite and clays with resins according to the invention used for impregnating fabrics because they increase the friction of the coated fabric; this is desirable when the final article is to be used in handling hot glassware.

Fibers can also be impregnated with an organopolysiloxane resin according to the invention to produce a plurality of fibers coated with the resin, and the coated fibers can be molded to a desired, predetermined shape prior to cure of the resin. Glass fibers are particularly suitable for this application; the fibers, prior to impregnation, can be associated as a woven or non-woven fabric, can be randomly associated as in products of the "glass wool" type, or can be discrete, independent fibers. In general, the fibers usually constitute from about 2 percent to about 25 percent of the total of fibers and organopolysiloxane resin. A particularly advantageous product can be produced by mixing from about 2 percent to about 25 percent of bentonite with an organopolysiloxane resin according to the invention, impregnating a glass fiber fabric with the resulting mixture, forming the fabric/resin to a desired configuration, and curing the resin. Such a composite can advantageously be a protective covering on tongs for handling glassware which is at an elevated temperature.

Solventless organopolysiloxane resins according to the invention have sufficient shelf life that they can be produced at one location by a resin supplier, and shipped to a different location for ultimate use by a fabricator.

It will be apparent that various changes and modifications of the invention as specifically described in the foregoing Examples and discussed above without departing from the spirit and scope thereof as defined in the appended claims.

We claim:

1. A process for producing a solventless organopolysiloxane resin that is liquid at room temperature, the process including the steps of:
    hydrolyzing, in an aqueous system, by heating a hydrolyzable organo silicon composition comprising at least one compound having the general formula:

$$Y_{(4-n)}Si(OR)_n$$

where Y is phenyl or methyl, R is an alkyl group having from one to three carbon atoms, and n is an integer from one to four, wherein the ratio of OR groups to silicon atoms in the composition is from about 2.3:1 to 3.1:1, the molar ratio of water/silane being about 1.5:1 to 2.25:1, and the amount of acid present expressed as HCl being about 2.3 to 1192 parts of HCl per million parts of silane and water to form a siloxane partial condensation product, concentrating the partial condensation product by heating to cause substantial siloxane formation by condensation and to distill therefrom water and alcohol by-products, precuring the concentrated partial condensation product by heating the product to remove volatile material at a temperature equivalent to that of about 140° C. to 160° C. for about 2 hours, and cooling the precured product to room temperature to provide a solventless organopolysiloxane that has a viscosity at 25° C. measured by a Brookfield LVT viscometer using a #3 spindle at 60 rpm of at least about 25 cps. but not greater than 10,000 cps, the solventless organopolysiloxane having a water content by weight of less than about 1 percent.

2. A process as claimed in claim 1, wherein a coating of the solventless organopolysiloxane resin is applied to a substrate and cured.

3. A process as claimed in claim 1, wherein from 2 percent to 25 percent of a particulate filler selected from the group consisting of carbon black, bentonite, clays, fused silica, graphite, metal oxide pigments, carbon, roofing stone and phosphatized carbon is mixed with the solventless organopolysiloxane, and a coating of the resulting mixture is applied to a substrate and cured.

4. A process as defined in claim 1 wherein the starting organo silicon compound is methyltriethoxy silane.

5. A process as claimed in claim 1 wherein there is an additional step during the precuring stage comprising determining the viscosity of the organopolysiloxane thereby to check the water content thereof, and, if the viscosity is not in said range of about 25 cps to 1200 cps, further precuring the organopolysiloxane until it is in said viscosity range to provide the solventless organopolysiloxane that is liquid at room temperature.

6. A process as claimed in claim 1 wherein the starting organo silicon compounds are methyltriethoxy silane, phenyl triethoxy silane and dimethyl diethoxysilane.

7. A process as claimed in claim 1 wherein Y is phenyl and methyl and R is ethyl.

8. A product made according to the process defined in claim 1 wherein the solventless organopolysiloxane produced is liquid at room temperature.

9. A solventless organopolysiloxane resin which is the product of the partial hydrolysis and condensation of a hydrolyzable organo silicon composition comprising at least one compound having the general formula $$Y_{(4-n)}Si(OR)_n$$

where Y is phenyl or a primary or secondary alkyl group having from one to four carbon atoms, R is an alkyl group having from one to three carbon atoms, and n is an integer from one to four, and wherein the ratio of OR groups to silicon atoms in the composition is from 2.3:1 to 3.1:1, the molar ratio of water/silane for hydrolysis being about 1.5:1 to about 2.25:1, the amount of acid present during hydrolysis expressed as HCl being from about 2.3 parts to 1192 parts per million parts of water and silane, the hydrolysis product being concentrated to remove water and alcohol by-products and precured at a temperature and time equivalent to that of a precure temperature of about 140° C. to 160° C. for about 2 hours, said solventless organopolysiloxane resin being liquid at room temperature and having a water content less than 1 percent and a viscosity measured by a Brookfield LVT Viscometer using a #3 spindle at 25° C. at least 25 cps but not greater than 10,000 cps.

* * * * *